Patented Feb. 9, 1937

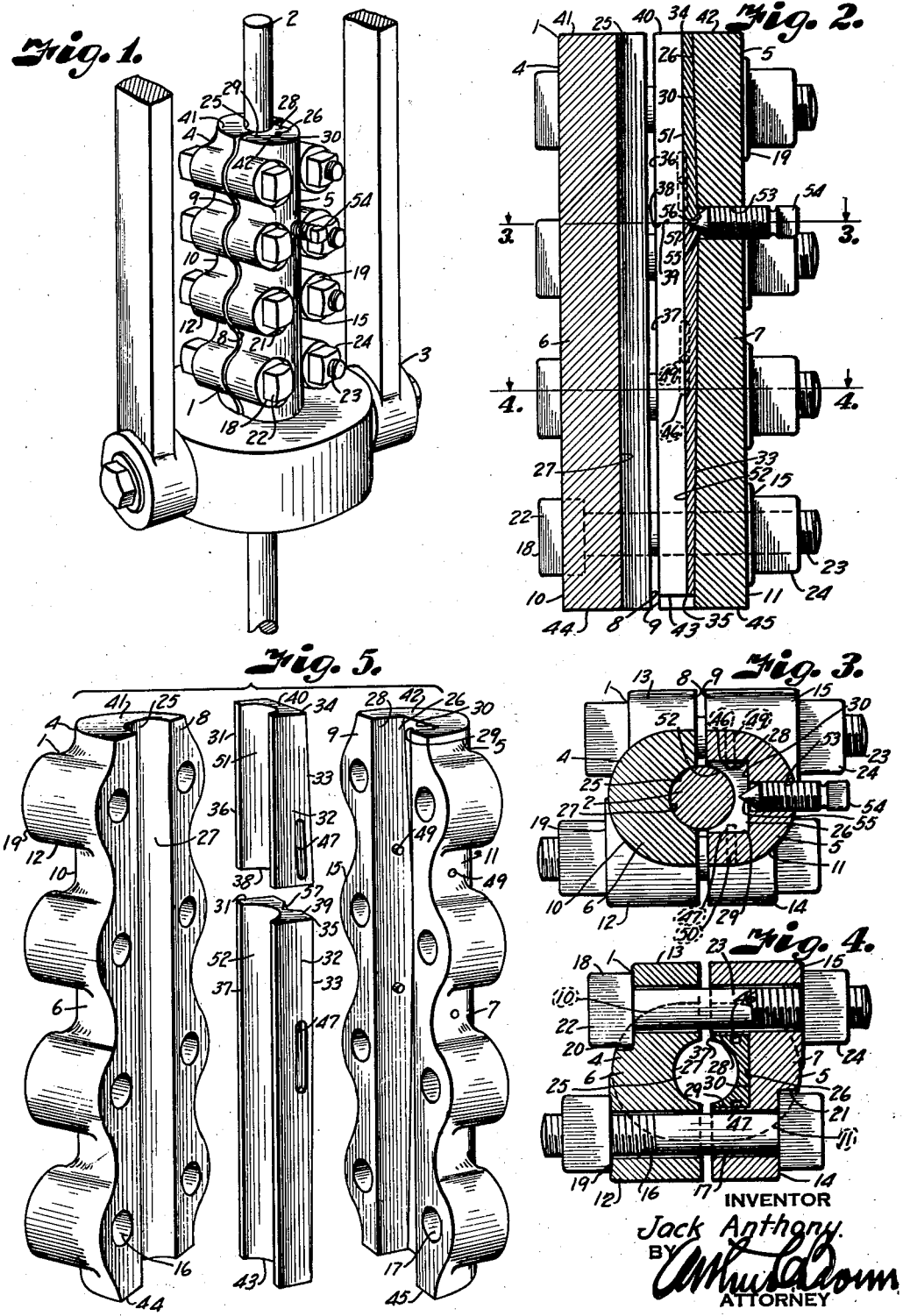

2,070,550

UNITED STATES PATENT OFFICE 2,070,550

CLAMP

Jack Anthony, Tulsa, Okla., assignor, by mesne assignments, of sixty per cent to Frank P. Collins and forty per cent to George Krell, both of Sapulpa, Okla.

Application December 16, 1935, Serial No. 54,705

14 Claims. (Cl. 24—243)

This invention relates to clamps, and particularly to those for use in connection with polish rods for supporting a string of sucker rods in a well pumping unit. Polish rod clamps are ordinarily constructed to grippingly engage the polish rod and carry the weight of the entire string including a hydrostatic head of oil in the tube. Owing to reciprocation of the sucker rods and the jarring conditions under which the clamps operate they are apt to become loosened with the resultant loss of the rods.

It is, therefore, the principal object of the present invention to provide a clamp of this character with positive means for gripping the polish rod so that jarring effects tend to enhance gripping engagement of the clamp with the rod rather than loosening it.

Another object of the invention is to provide a clamp with reversely arranged slips whereby engagement is enhanced in both directions relatively to the reciprocation of the rods, thereby preventing loosening of the clamp on the upstroke in case the rods should strike any obstruction, such as a fluid head or the like.

In accomplishing these and other objects of the invention, as hereinafter pointed out, I have provided improved details of structure, the preferred form of which is illustrated in the accompanying drawing wherein:

Fig. 1 is a perspective view of a polish rod clamp grippingly engaging a polish rod and supported by the hanger of a pumping unit.

Fig. 2 is an enlarged vertical section through the clamp particularly illustrating the slip assembly.

Fig. 3 is a horizontal section on the line 3—3 of Fig. 2.

Fig. 4 is a cross section on the line 4—4 of Fig. 2.

Fig. 5 is a detail perspective view of the parts of the clamp in disassembled spaced relation.

Referring more in detail to the drawing:

1 designates a polish rod clamp constructed in accordance with the present invention and which is adapted to engage a polish rod 2 for suspendingly supporting a string of sucker rods from the hanger 3 of a pump unit (not shown), as in conventional well pumping practice. The clamp 1 includes mating sections 4 and 5, each including elongated substantially semi-cylindrical bodies 6 and 7, having flattened mating faces 8 and 9 and rounded outer sides 10 and 11 provided with vertically spaced series of ears 12—13 and 14—15 extending from opposite sides of the respective sections and having registering bores 16 and 17 to pass fastening devices such as bolts 18.

The ears 12 and 15 are preferably of sufficient thickness so that the outer faces 19 thereof align with or extend slightly beyond the outer rounded faces of the body sections. The ears 13 and 14, however, may be of less thickness and the body sections on that side are recessed, as at 20 and 21, to seat the heads 22 of the fastening devices 18 when the shanks 23 thereof are projected through the aligning bores 16 and 17 of the respective ears, the shanks of the bolts being of sufficient length to project beyond the faces 19 of the ears 12 and 15 to mount nuts 24 that are threaded thereon to draw the sections about the polish rod 2, as later described.

The recesses 20 and 21 are preferably conformed to the shape of the heads 22 to prevent rotation of the fastening devices upon application of the nuts 24, thereby eliminating the necessity of a wrench to hold the heads.

The mating faces of the sections are provided with longitudinal grooves 25 and 26 positioned midway between the bores 15 and 16 of the respective ears. The groove 25 conforms in radius to that of the polish rod to form an engaging face 27, the depth of which is less than the radius thereof so as to provide clearance between the mating faces of the body sections when they are engaged with the polish rod, as later described. The groove 26 in the body section 5 is of rectangular cross section and extends in parallel registry with the groove 25 to provide slip engaging sides 28 and 29 and a bottom face 30 for engaging the sides 31 and 32 and back faces 33 respectively of slips 34 and 35 that are mounted in abutting relation in the ends of the groove. The bottom face 30 of the groove slopes from the ends thereof to a point aligning with the abutting ends of the slips to provide wedge-like engagement with the respective slips in the directions of the ends of the clamp. The slips 34 and 35 conform in size and shape to the groove 26 so that they are freely slidable therein and have their rear faces 33 conforming to the taper of the bottom portions of the groove whereby the front edges 36 and 37 extend in parallel relation with the mating face 9.

The slips are of sufficient length so that when the flat abutting ends 38 and 39 thereof are in engagement, the opposite flattened end 40 of the upper slip registers with the flattened ends 41 and 42 of the sections but the lower flattened end 43 of the slip 35 terminates short of the flattened ends 44 and 45 of the sections, as clearly shown in Fig. 2, to allow slight downward movement of the lower slip when the body of the clamp is engaged with the hanger 3.

In order to retain the slips within their seat, the side faces 31 and 32 thereof are provided with grooves 46 and 47 in which are projected the ends of pins 49 that are extended through suitable openings 50 in the sides of the clamp section at points between selected ears, as clearly shown in Fig. 5. The slips are provided with arcuate gripping faces 51 and 52 conforming to the radius of the polish rod and located in registry with the gripping face in the clamp section 4.

In order to move the slips and enhance gripping engagement thereof imparted by the fastening devices 18, the clamp section 5 is provided with a threaded opening 53 that is located at the joining point of the upper and lower wedge faces of the slips. Threaded in the opening 53 is a set screw 54 having a cone-shaped point 55 engaging similar shaped notches 56 and 57 in the abutting ends of the slips, as best shown in Figs. 2 and 5. It is thus obvious that when the set screw is threaded into the opening the cone point thereof effects a camming action against the ends of the slips to spread them apart and force them upwardly and downwardly on their respective wedge seats to enhance the gripping action of the slips.

In using a polish rod clamp constructed as described the clamp sections 4 and 5 are placed about the end of the polish rod that projects above the hanger 3 so that the lower flattened ends 44 and 45 thereof seat thereagainst when the hanger and the sucker rods are at the lower end of the stroke. The fastening devices are then projected through the registering ears of the sections after which the nuts 24 are applied to draw the sections into gripping engagement with the polish rod. The set screw 54 is then threaded into wedging relation with the slips to slightly spread them apart and enhance the grip thereof incidental to their wedge-shaped seat, the set screw moving the slips in opposite directions toward the shallower ends of the groove 26 which, of course, moves the arcuate shaped gripping faces 51 and 52 thereof tighter against the engaging face of the polish rod. When the clamp is in this position the lower ends of the bottom slip clear the face of the hanger to allow subsequent adjustment of the slip as well as movement thereof into firmer grip with the polish rod.

When the pump unit is in operation the weight of the rods, together with the weight of the well fluid in the tubing, causes downward movement of the lower slip to increase the grip on the polish rod. In case that the rods should encounter any interference on their upstroke, such as a fluid head, the upper slip will tend to shift upwardly on its wedge-shaped seat to increase gripping contact thereof and prevent loosening of the lower slip. It is thus obvious that the slips at the respective ends of the clamp grip the polish rod in such a manner that it is substantially impossible for the rod to slip relatively thereto.

From the foregoing it is obvious that I have provided a polish rod clamp that is positively engaged with the polish rod so that it becomes in effect a substantially integral part thereof and is not likely to loosen under operating conditions as above noted.

What I claim and desire to secure by Letters Patent is:

1. A clamp including a clamp body, and separate slips having wedge-like mounting in the clamp body for movement toward the respective ends of the clamp body for simultaneously gripping a member secured by the clamp when the clamp is engaged with said member.

2. A clamp including a clamp body, separate slips having wedge-like mounting in the clamp body for movement toward the respective ends of the clamp body for simultaneously engaging a member secured by the clamp, and means for moving the slips into engaging position responsive to application of the clamp body to said member.

3. A clamp including a clamp body, separate slips movably mounted in and having wedge-like bearing with the respective ends of the clamp body for simultaneously engaging a member secured by the clamp, and means for moving the slips into engaging position including a set screw threaded into the clamp body and having a means for engaging adjacent ends of the slips to spread the slips apart.

4. A clamp including a pair of body sections adapted to be arranged at opposite sides of a member to be gripped thereby, means securing the body sections about said member, and a slip having guided wedge-like support on one of the sections to cooperate with the other section for enhancing the grip on said member incidental to drawing the sections together by said securing means.

5. A clamp including a pair of body sections, means securing the body sections about a member to be gripped by the clamp, and separate slips having guided wedge-like bearing within the respective ends of one section and cooperating with the other section to supplement the grip of said member incidental to drawing the sections together by said securing means.

6. A clamp including a pair of body sections, means securing the body sections about a member to be gripped by the clamp, separate slips having guided wedge-like bearing within the respective ends of one section and cooperating with the other to supplement the grip on said member, and a set screw including wedging means engaging between said slips to enhance the gripping action of the slips.

7. A clamp including a pair of mating body sections having a gripping face and a slip seat respectively, said slip seat extending longitudinally of said section and having lesser depths toward the ends thereof, oppositely arranged slips guided in the respective ends of the slip seat and having gripping faces cooperating with said gripping face of the other section, and means for securing the sections together about a member to be gripped and for urging the slips into gripping action.

8. A clamp including a pair of mating body sections having a gripping face and a slip seat respectively, said slip seat extending longitudinally of said section and having lesser depths toward the ends thereof, oppositely arranged slips guided in the respective ends of the slip seat and having gripping faces cooperating with said gripping face of the other section, means for securing the sections together about a member to be gripped, and wedging means engageable between said slips to enhance said gripping action.

9. A clamp including a pair of mating body sections having a gripping face and a slip seat respectively, said slip seat extending longitudinally of said section and having lesser depths toward the ends thereof, oppositely arranged slips guided in the respective ends of the slip seat and having gripping faces cooperating with said gripping face of the other section, means for securing the sections together about a member to be gripped, and a set screw threaded into the section having the slip seat and having a cone-shaped end to spread the slips apart.

10. A clamp including a pair of mating body sections having a gripping face and a slip seat respectively extending longitudinally of said sections, oppositely arranged slips guided in the respective ends of the slip seat and having gripping faces cooperating with said gripping face of the other section, and means for securing the sections together about a member to be gripped, said slip seat and slips having wedge-shaped engaging portions whereby the gripping action of said slips are supplemented responsive to thrusts imparted on said member.

11. A clamp including a pair of mating body sections having a gripping face and a slip seat respectively extending longitudinally of said sections, oppositely arranged slips in the respective ends of the slip seat and having gripping faces cooperating with said gripping face of the other section, means for securing the sections together about a member to be gripped, and wedging means engageable between said slips to enhance said gripping action, said slp seat and slips having wedge-shaped engaging portions whereby the gripping action of said slips are supplemented responsive to thrusts imparted on said member.

12. A clamp including a pair of mating body sections having a gripping face and a slip seat respectively extending longitudinally of said sections, oppositely arranged slips in the respective ends of the slip seat and having gripping faces cooperating with said gripping face of the other section, means for securing the sections together about a member to be gripped, and a set screw threaded into the section having the slip seat and having a cone-shaped end to spread the slips apart, said slip seat and slips having wedge-shaped engaging portions whereby the gripping action of said slips are supplemented responsive to thrusts imparted on said member.

13. A clamp including a pair of mating body sections having a gripping face and a slip seat respectively, said slip seat extending longitudinally of said section and having gradually lessening depth toward the ends thereof, ears extending from opposite sides of said sections, slips in the respective ends of the slip seat and having gripping faces cooperating with said gripping face of the other section, fastening devices extending through said ears for securing the sections together about a member to be gripped and wedging means engageable between said slips to move said slips toward the shallower ends of said slip seat for enhancing said gripping action.

14. A clamp including a pair of body sections having registering ears projecting from the sides thereof, fastening devices extending through said ears for securing the body sections about a member to be gripped by the clamp, and slips having guided and wedge-like bearing at the respective ends of one section and cooperating with the other section to supplement the grip on said member incidental to tightening of said fastening devices.

JACK ANTHONY.